(12) United States Patent
Bailly

(10) Patent No.: US 6,590,789 B2
(45) Date of Patent: Jul. 8, 2003

(54) METHOD AND APPARATUS FOR REGULATING OUTPUT VOLTAGE OF A VOLTAGE CONVERTER

(75) Inventor: Alain Bailly, Rousset (FR)

(73) Assignee: STMicroelectronics S.A., Montrouge (FR)

( * ) Notice: Subject to any disclaimer, the term of this patent is extended or adjusted under 35 U.S.C. 154(b) by 0 days.

(21) Appl. No.: 10/000,780

(22) Filed: Oct. 31, 2001

(65) Prior Publication Data

US 2002/0093839 A1 Jul. 18, 2002

(30) Foreign Application Priority Data

Oct. 31, 2000 (FR) ............................................ 00/14015

(51) Int. Cl.[7] .......................................... H02M 3/335
(52) U.S. Cl. .................. 363/21.12; 363/21.16
(58) Field of Search ......................... 363/21.12, 21.13, 363/21.15, 21.16, 131

(56) References Cited

U.S. PATENT DOCUMENTS

| | | | |
|---|---|---|---|
| 5,438,499 A | | 8/1995 | Bonte et al. |
| 5,812,383 A | * | 9/1998 | Majid et al. .................. 363/21 |
| 5,831,839 A | | 11/1998 | Pansier |
| 5,841,643 A | | 11/1998 | Schenkel |
| 6,061,257 A | * | 5/2000 | Spampinato et al. ......... 363/56 |
| 6,208,538 B1 | * | 3/2001 | Halamik et al. .............. 363/41 |

OTHER PUBLICATIONS

Goodenough F.: "ICS Build Off–Line Isolated Switchers" Electronic Design, Penton Publishing, Cleveland, OH, US, vol. 39, No. 16, Aug. 22, 1991, pp. 35–37, 40, 44.
Linear Technology: "LT1103/LT1105 Offline 1, 7 Switching Regulator" Data Sheet, 1992.

* cited by examiner

Primary Examiner—Adolf Deneke Berhane
(74) Attorney, Agent, or Firm—Wolf, Greenfield & Sacks, P.C.; James H. Morris

(57) ABSTRACT

A voltage converter including a circuit for controlling a switch for providing current to a primary winding of a transformer with inverted phase points, a secondary winding of which is associated with a capacitor for providing a regulated D.C. output voltage and an auxiliary winding of which provides a supply voltage of the control circuit. The average value of the voltage across the auxiliary winding close to the end of its demagnetization periods.

27 Claims, 5 Drawing Sheets

METHOD AND APPARATUS FOR REGULATING OUTPUT VOLTAGE OF A VOLTAGE CONVERTER

BACKGROUND OF THE INVENTION

1. Field of the Invention

The present invention relates to the field of power converters of switched-mode power supply type. The present invention more specifically relates to isolated power supplies, that is, power supplies having no common point between the input voltage (for example, the A.C. supply system) and the regulated D.C. output voltage. The isolation is obtained by means of a transformer having a primary winding associated with a pulse-width modulation controlled switch, and having a secondary winding associated with a diode and with a capacitor providing the output voltage.

2. Discussion of the Related Art

FIG. 1 shows a conventional example of a switched-mode power supply of the type to which the present invention applies. Two input terminals P and N receive an A.C. voltage Vac, for example the mains voltage. Voltage Vac is rectified, for example in a fullwave manner, by means of a diode bridge 1. The A.C. input terminals of bridge 1 are connected to terminals P and N and its rectified output terminals 2 and 3 provide a voltage Vr. Voltage Vr is generally smoothed by means of a capacitor C1 connected between terminals 2 and 3 which form the input terminals of the actual switched-mode power supply.

The converter of FIG. 1 is a so-called flyback converter in which a transformer 4 with inverted phase points has its primary winding 5 connected in series with a switch 6 between terminals 2 and 3. The phase point of winding 5 is connected to a terminal of switch 6, the other terminal of which is connected to terminal 3. Switch 6 is connected in switched mode and at a non-audible high frequency (generally greater than 20 kHz). A secondary winding 7 of transformer 4 is associated with a capacitor C2 across the terminals Sp and Sn of which is provided D.C. output voltage Vout. The phase point of winding 7 is connected to terminal Sp by a diode D1, the cathode of diode D1 being connected to terminal Sp. The other terminal of winding 7 is connected to terminal Sn.

When switch 6 is on, the phase point of winding 7 is at a negative potential. Diode D1 thus is off and a current is stored in primary winding 5. Upon turning off of switch 6, the phase points of windings 5 and 7 both become positive. Diode D1 is forward biased. Capacitor C2 is then charged with the power transferred to secondary winding 7.

Switch 6 (for example, a MOS transistor) is, in the example of FIG. 1, integrated in a circuit 10 with its electronic control circuit. An example of such an integrated circuit, sold by STMicroelectronics Company, is known under trade name VIPER. Circuit VIPER includes an input terminal Vdd intended for receiving a positive power supply, a voltage reference terminal Vss connected to ground, and a terminal FB receiving an error signal. Finally, a terminal 12 is connected to the drain of the integrated N-channel transistor, the source of which is connected to terminal Vss. The gate of transistor 6 is connected at the output of a control circuit 11 (CTRL). Circuit 11 includes a comparator (not shown), a first input of which receives an internal voltage reference and a second input of which is connected, internally, to the positive supply terminal. A VIPER circuit is controlled by a current. The control, that is, the modification of the width of control pulses of switch 6, is performed by, for example, using compensation loop integrated circuit 10, which itself attempts to maintain its supply voltage (Vdd-Vss).

Thus, in an application to a switched-mode converter, terminal Vdd is connected, by a diode D2, to the phase point of an auxiliary winding 8 of transformer 4. The anode of diode D2 is connected to the phase point of the winding. The other terminal of auxiliary winding 8 is connected to reference terminal 3 of the rectified voltage. Auxiliary winding 8 has the function of providing the supply voltage of circuit 10. Terminal FB is connected to the midpoint 13 of a series connection of a zener diode DZ and of a capacitor C3. A capacitor C4 for filtering the local supply voltage is connected between terminal Vdd and terminal 3, the latter being connected to terminal Vss of circuit 10.

In the assembly of FIG. 1, the output voltage is set by the value of the zener diode and the transformation ratio between primary and secondary windings 5 and 7. Auxiliary winding 8, which gives an image of the output voltage, is used, the auxiliary winding being directly in phase with secondary winding 7. The voltage in this winding 8 is thus proportional to the voltage in secondary winding 7.

A disadvantage of the converter of FIG. 1 is that the regulation of output voltage Vout is not very accurate. This disadvantage is illustrated by FIG. 2, which shows the characteristic of output voltage Vout according to the current Iout taken by the load connected across terminals Sp and Sn of the converter. It can be considered that, for a nominal voltage Vnom for which the converter is sized, a regulation to more or less 10% of this nominal voltage is obtained for currents ranging between two respectively minimal and nominal values Imin and Inom. Currents Imin and Inom correspond, in practice, to respectively 10% and 100% of the maximum current for which the converter is sized.

When the current surge of the load supplied by the converter is smaller than value Imin, voltage Vout significantly increases as the current decreases. This phenomenon is, among others, due to the fact that noise (voltage peaks) present at the beginning of each demagnetization cycle of auxiliary winding 8 is no longer negligible as compared to the demagnetization period, which is very short. These peaks then strongly influence the value of the voltage across auxiliary winding 8. Capacitor C4 then charges to the maximum value of these peaks.

Between values Imin and Inom, voltage Vout slightly decreases (between +10 and −10% of nominal value Vnom) as the demagnetization period increases. The noise peaks at the beginning of each demagnetization period become more and more negligible.

When the current drawn by the load becomes greater than value Inom, the decrease slope of voltage Vout strongly increases. This is due to the fact that the duty cycle used by the converter is maximum. The output voltage level then cannot be maintained.

More and more often, the low current range (under Imin) is used for power saving reasons (for example, during stand-by periods of the circuits powered by the converter).

To obtain an accurate regulation of output voltage level Vout even for a low current, it is conventionally necessary to provide a regulation of the voltage at the transformer secondary.

FIG. 3 shows an example of a converter implementing such a conventional solution. It shows a transformer 4 having primary and secondary windings 5 and 7 with inverted phase points and having an auxiliary winding 8 providing a supply voltage to a VIPER-type circuit 10. Rectifying bridge 1 and capacitor C1 have not been shown in FIG. 3 but are of course present. As compared to the assembly of FIG. 1, zener diode DZ is replaced with a phototransistor T of an optocoupler 14, the diode D of which conveys a measurement signal coming from the secondary of transformer 4. The anode of diode D is connected, by a resistor R, to D.C. output terminal Sp. The cathode of diode D is connected, by a resistor R1 in series with a zener diode DZ1, to terminal Sn, the anode of diode DZ1 being connected to terminal Sn. When the output voltage reaches the threshold voltage of diode DZ1 in series with the D.C. voltage across diode D of the optocoupler, a current flows through these elements, as well as through the optotransistor. This current flow causes a decrease in the power sent to the secondary by reducing the peak current in switch 6. The gain between the current on terminal FB and this peak current is indeed negative. The more the current is increased on terminal FB, the less power is sent to the secondary.

Other assemblies using a regulation based on a measurement of the voltage at the secondary are known. All these assemblies have in common the use of an additional galvanic isolation component to transmit a regulation order between the secondary and the primary. In the assembly of FIG. 3, said component is optocoupler 14.

SUMMARY OF THE INVENTION

The present invention aims at overcoming the disadvantages of known inverted phase point transformer converters.

The present invention aims, in particular, at enabling accurate regulation of the output voltage without it being necessary to use additional galvanic isolation means between the secondary and the primary of the transformer.

To achieve these and other objects, the present invention provides a voltage converter including a circuit for controlling a switch for providing current to a primary winding of a transformer with inverted phase points, a secondary winding of which is associated with a capacitor for providing a regulated D.C. output voltage and an auxiliary winding of which provides a supply voltage of the control circuit, including a means for measuring the average value of the voltage across the auxiliary winding close to the end of its demagnetization periods.

According to an embodiment of the present invention, the measurement means is formed of a resistive and capacitive network forming an averager, the time constant of which is small as compared to the switch control pulse period.

According to an-embodiment of the present invention, said measurement means only receives the voltage of the auxiliary winding during demagnetization periods of the secondary winding.

According to an embodiment of the present invention, the converter includes a means for detecting the demagnetization periods of the auxiliary winding.

According to an embodiment of the present invention, said detection means includes a first circuit providing a two-state signal of detection of the edges of the voltage across the secondary winding, and a second circuit for defining a window in which the detection result of the first circuit is taken into account.

According to an embodiment of the present invention, said window starts with the opening of said switch and ends with the first following zero crossing of the voltage across the auxiliary winding.

According to an embodiment of the present invention, the average voltage across the auxiliary winding is used to control the width of the switch turn-on pulses.

According to an embodiment of the present invention, the switch and its control circuit are integrated in a same circuit.

The foregoing objects, features and advantages of the present invention will be discussed in detail in the following non-limiting description of specific embodiments in connection with the accompanying drawings.

DETAILED DESCRIPTION

Figure 1:
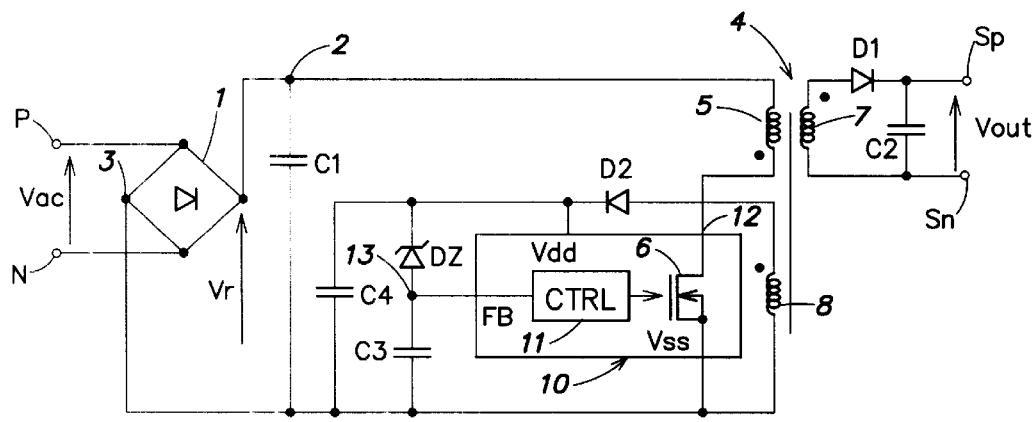
FIGS. 1 to 3, previously described, are intended to show the state of the art and the problem to solve.
Figure 2:
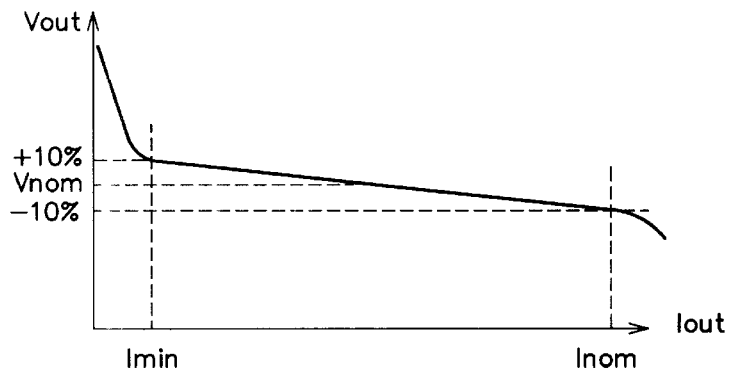

The same elements have been designated with the same references in the different drawings. FIGS. 2, 4, and 6A to 6E are not to scale. For clarity, only those components of the converter which are necessary to the understanding of the present invention have been shown in the drawings and will be described hereafter. In particular, the internal structure of a VIPER-type integrated control circuit has not been detailed and is, as well as the operation of such a circuit, well known.

The present invention originates from an analysis of the behavior of the auxiliary winding of an isolation transformer of a power converter in variations of the output current surged by the load connected to the secondary winding. For a given output voltage, a variation in the output current translates as a shift in time of the time of end of demagnetization of the secondary winding in the output capacitor, and thus of the time of end of demagnetization of the auxiliary winding. Further, the present inventor has noticed that the voltage at the end of the demagnetization is, for a fixed output voltage, independent from the output current.

Figure 3:
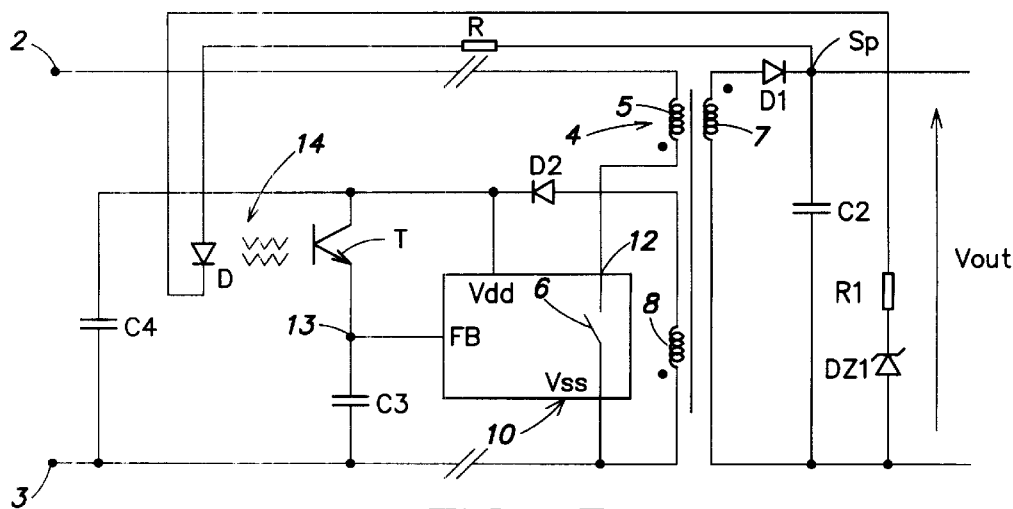
Figure 4:
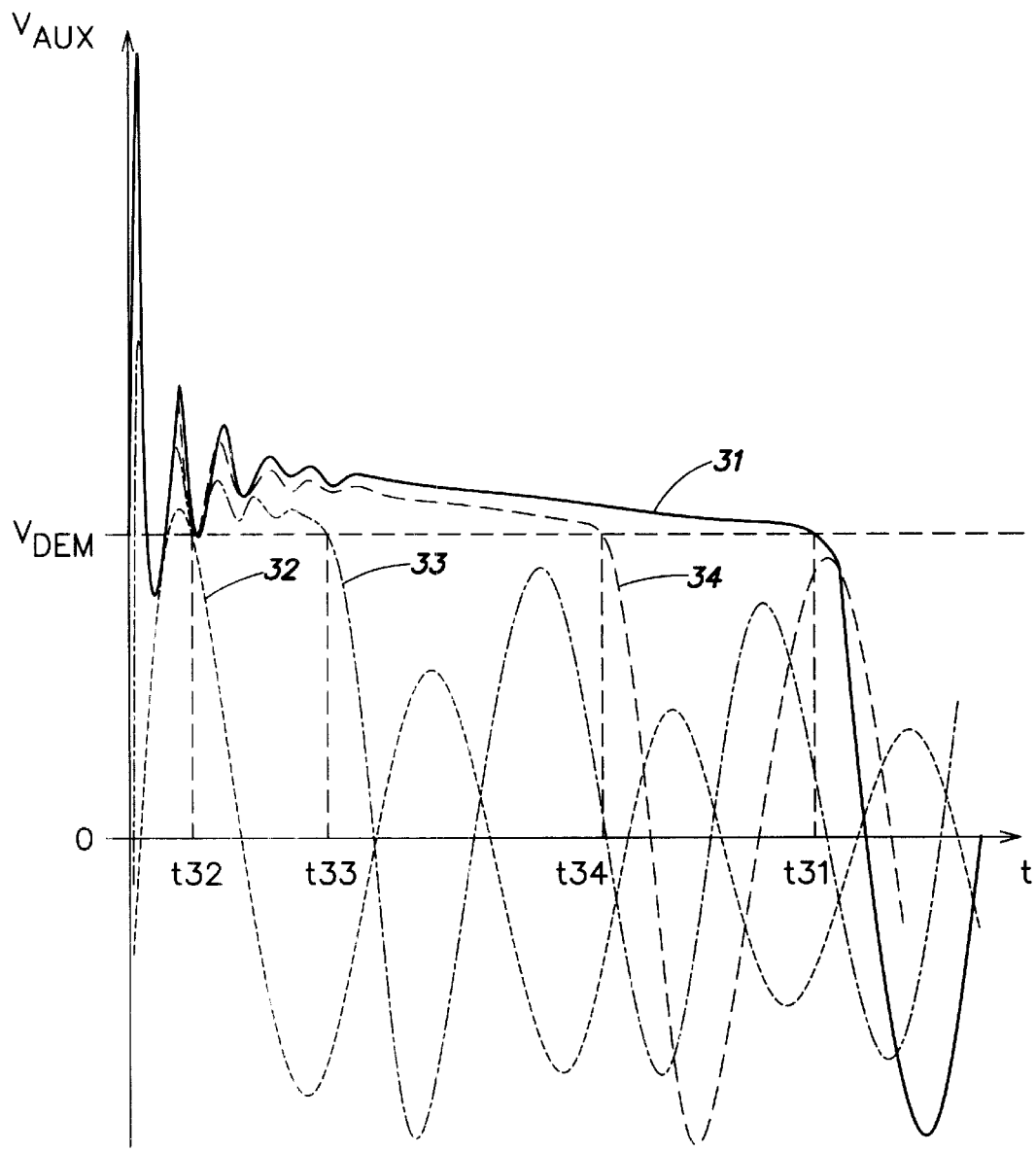
FIG. 4 shows the characteristic of the voltage across an auxiliary winding of a power converter for several values of the current surged by the load supplied by this converter.

FIG. 4 illustrates this phenomenon and represents, for an output voltage Vout maintained at a constant value, the course of voltage $V_{AUX}$ across the auxiliary winding of a converter for four values of the current consumed by the load. A first curve 31 in full line illustrates the case of a strong current surge where the demagnetization duration is long (until a time t31) and where, conventionally, the oscillations of the demagnetization beginning introduce an error on the voltage filtered by capacitor C4 (FIG. 1 or 3). A second curve 32 in dashed lines illustrates the case of a very low current surge, where the demagnetization duration is very short (until a time t32). Curve 32 corresponds to a current surge smaller than the minimum value (Imin, FIG. 2). Two curves 33 and 34, respectively in stripe-dot lines and in interrupted lines, represent intermediary cases. Curve 33 corresponds to the limiting case where the oscillations just have time to damp before time t33 of end of demagnetization. It can be considered that this is the case where the current consumed by the load corresponds to current Imin. Curve 34 illustrates another case (than curve 31) of a demagnetization duration (until a time t34).

The curves of FIG. 4 well illustrate that the times of end of demagnetization (where voltage $V_{AUX}$ abruptly drops)

t31, t32, t33, t34, all occur at a same voltage level $V_{DEM}$ in the auxiliary winding. Further, the average value of voltage $V_{AUX}$ during demagnetization is a function of the current surged by the load, the secondary and auxiliary windings being in direct phase relation with each other.

It can be considered that by measuring the average value of voltage $V_{AUX}$ over a small interval before the end of the demagnetization, that is, before voltage $V_{AUX}$ drops, a reliable image of the voltage across the secondary winding is obtained. Finally, it can be seen that the course of voltage $V_{AUX}$, after demagnetization, is not stable but rather oscillates. However, the voltage level then remains lower than level $V_{DEM}$ of end of demagnetization.

Based on these premises, the present inventor considers that the value of the voltage across the auxiliary winding just before the end of demagnetization gives an image of output voltage Vout. Indeed, a variation of the current consumed by the load translates, in practice, as a variation of the output voltage for which the regulation circuits tends to compensate by modifying the width of the control pulses, and thus the amount of power to be transferred to the secondary.

Thus, a feature of the present invention is to measure the voltage across the auxiliary winding only during periods of demagnetization of the secondary and auxiliary windings of the transformer. This measured voltage is used, according to the present invention, as a base for the regulation of the pulse-width modulation of the switch control signal. In other words, the present invention provides sampling the voltage across the auxiliary winding to obtain an image of the output voltage.

Figure 5:
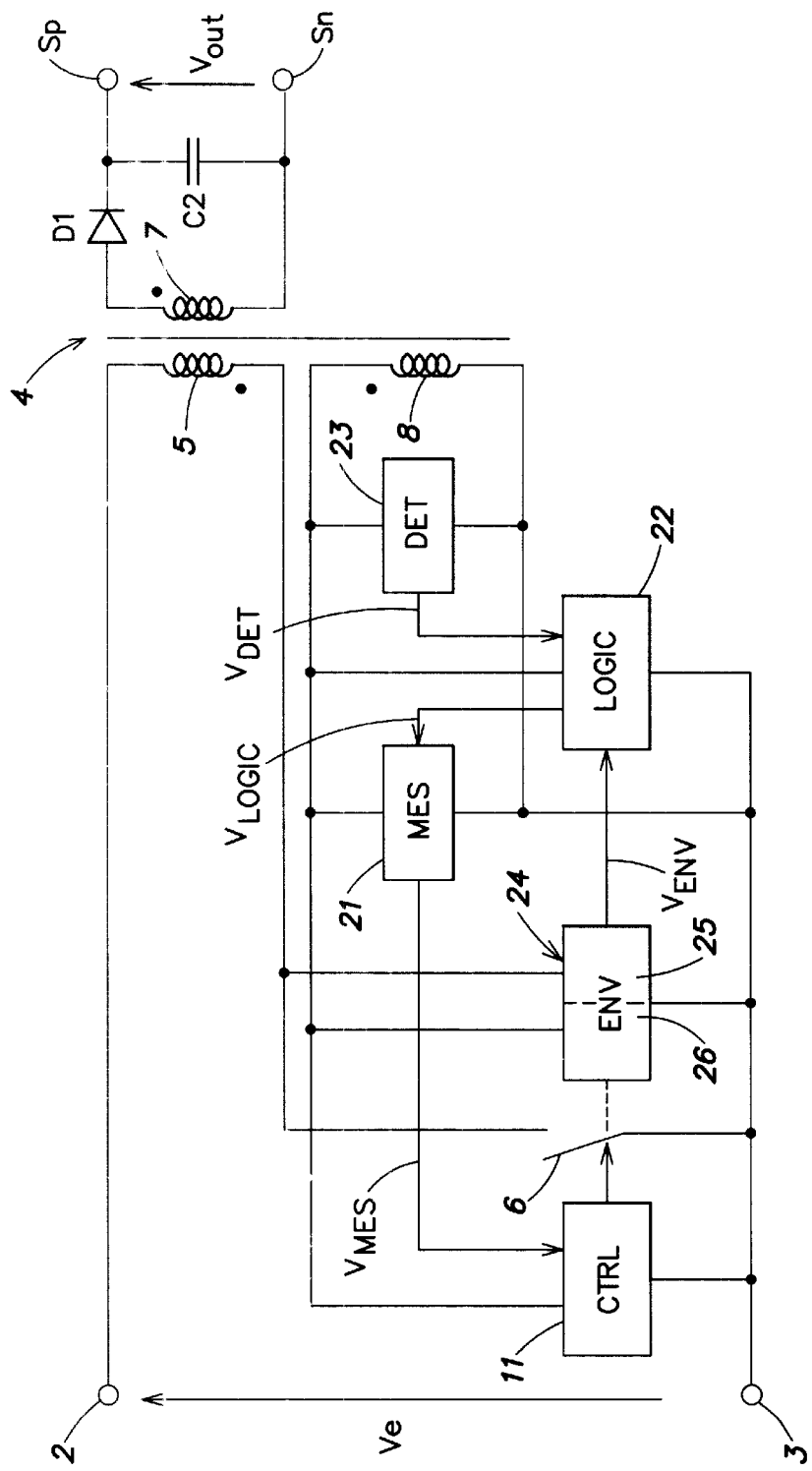
FIG. 5 partially and very schematically shows, in the form of blocks, an embodiment of a power converter according to the present invention.

FIG. 5 very schematically shows an embodiment of a power converter according to the present invention. As previously, the converter receives, between input terminals 2 and 3, a rectified and filtered voltage Ve. Voltage Ve is obtained, for example, by rectification and filtering of an A.C. supply voltage, for example, the mains. However, voltage Ve may, as an alternative, come from any supply source, including a D.C. source.

Conventionally, a switch 6 is connected in series with a primary winding 5 of an isolation transformer 4 between terminals 2 and 3. Switch 6 is controlled by a pulsewidth modulation circuit 11 (CTRL) having a relatively high frequency (for example, several tens of kHz). The power stored in winding 5 during the on periods of switch 6 is given back to a secondary winding 7 of transformer 4 when switch 6 is off. The phase points of windings 5 and 7 are inverted. On the secondary side, a storage capacitor C2 is provided, after rectification (by a diode D1) of the voltage across winding 7. Capacitor C2 provides a regulated D.C. voltage Vout across two respectively positive and negative output terminals Sp and Sn. Circuit 11 and switch 6 are, for example, integrated in a same VIPER-type circuit. This circuit is supplied by a D.C. low voltage recovered across an auxiliary winding 8 of transformer 4. Auxiliary winding 8 is in direct phase relation with secondary winding 7.

According to the present invention, the demagnetization periods of auxiliary winding 8 are detected to measure the average value of voltage $V_{AUX}$ thereacross and use it as a measurement signal for the regulation. The average value is measured by an averager circuit 21 (MES) connected across auxiliary winding 8 and providing a signal VMES to circuit 11. The measured value VMES is stored until the next demagnetization cycle. According to the present invention, averager 21 has a small time constant as compared to the duration of a demagnetization cycle. This enables, for relatively long demagnetization cycles, not taking account of cycle beginning oscillations. This also enables only retaining the end of the demagnetization. Conversely to a filtering of the auxiliary voltage (capacitor C4, FIG. 1 or 3), a feature of the present invention thus is to measure the average value over short periods as compared to the switching period. For relatively short demagnetization cycles (current Iout<Imin), a correct measurement is preserved due to the fact that the demagnetization cycle beginning oscillations are, in this case, of small amplitude and approximately centered on the end-of-demagnetization voltage (curve 32, FIG. 4).

According to the present invention, measurement circuit 21 is only activated during demagnetization phases of auxiliary winding 8 (and thus of secondary winding 7). Circuit 21 receives a signal VLOGIC from an activation circuit 22 (LOGIC). Circuit 22 has the function of combining detection signals VDET and VENV coming, respectively, from a detector 23 (DET) of demagnetization periods and from a detector 24 (ENV) taking into account, among others, the off periods of switch 6. Detector 24 provides a signal VENV representing a detection window allowing taking into account the result of detector 23, provided that switch 6 is off and that this result is not due to the oscillations that follow each demagnetization cycle before switch 6 turns on. Any risk of untimely activation in periods where the secondary and auxiliary windings cannot be in demagnetization is thus avoided.

To provide signal $V_{ENV}$, circuit 24 includes, for example, a circuit 25 for detecting off periods of switch 6, connected in parallel on this switch, and a circuit 26 for detecting the oscillations after demagnetization, which receives voltage $V_{AUX}$.

To detect demagnetization periods, circuit 23 preferably detects the rising and falling edges of voltage $V_{AUX}$. Such edges are likely to be present, not only at the beginning of each demagnetization cycle, but also out of demagnetization periods. For cycle beginning noise, the choice of an averager for measuring voltage $V_{AUX}$ enables solving the problem. For the other noise, its taking into account is avoided by using signal $V_{ENV}$ as an envelope inside of which the result of detector 23 is taken into account. The use of detector 24 is thus linked to the chosen solution (edge detector) to detect demagnetization periods. Detector 24 and logic circuit 22 are thus optional if another detection method is used.

The operation of a power converter according to the present invention is illustrated by the timing diagrams of FIGS. 6A to 6E which show, respectively, an example of the course of signals $V_{AUX}$, $V_{ENV}$, $V_{DET}$, $V_{LOGIC}$, and $V_{MES}$.

Figure 6A:
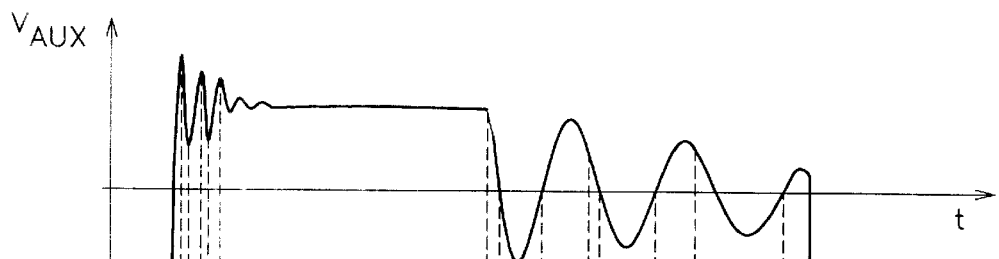
FIGS. 6A to 6E illustrate, in the form of timing diagrams, the operation of a power converter according to the present invention.
Figure 6B:
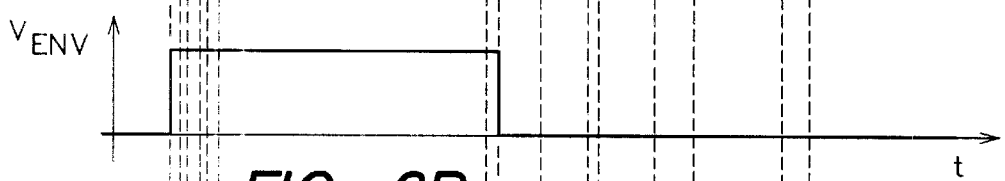
Figure 6C:
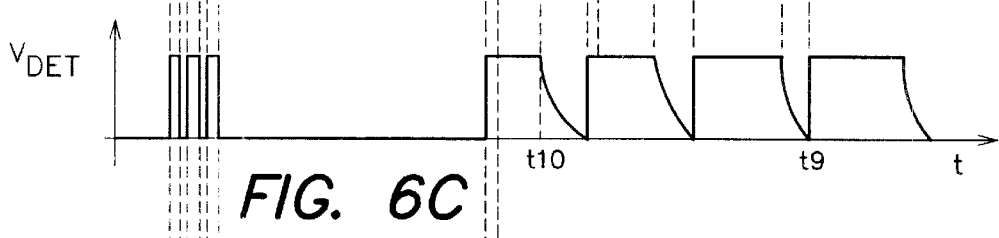
Figure 6D:
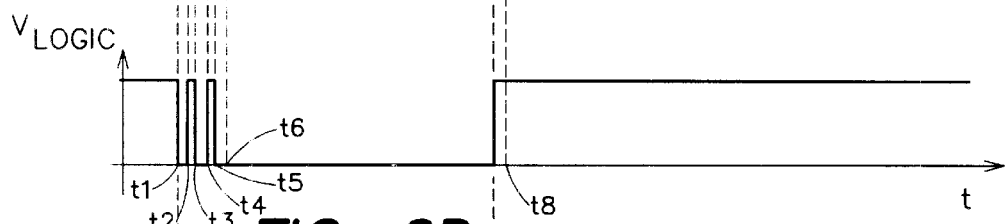

It is assumed that at a time t1, switch 6 opens. Voltage $V_{AUX}$ (FIG. 6A) switches from a negative to a positive biasing. The turning-off of switch 6 is detected by circuit 24, which activates (for example, to the high state) signal $V_{ENV}$ (FIG. 6B). The positive rising edge of signal $V_{AUX}$ is detected by circuit 23 which switches high (FIG. 6C). The following falling edge (time t2) activates (for example, to the low state) signal $V_{DET}$. Signal $V_{LOGIC}$ (FIG. 6D) then switches to a state (for example, low) of activation of averager 21.

The edges of the demagnetization cycle beginning oscillations are detected by signal $V_{DET}$ (times t3, t4, t5, and t6) and cause switchings of signal $V_{LOGIC}$. Although the averager is successively deactivated and activated, measurement signal $V_{MES}$ is not sensitive to the cycle beginning deactivations due to the time constant of the averager. Once signal $V_{AUX}$ has been stabilized, the averager remains activated until the end of the demagnetization detected by circuit 23 (signal $V_{DET}$) at a time t7.

After time t7, signal $V_{AUX}$ undergoes other oscillations, centered on the voltage zero, before turning-on of switch 6, which occurs at a time t9. These oscillations are detected by circuit 23, but circuit 24 forbids their taking into account by circuit 22 of activation of averager 21. For this purpose, signal $V_{ENV}$ switches low at the first biasing inversion (time t8) that follows the demagnetization beginning, and remains in this state until the next turning-off of switch 6.

Figure 6E:
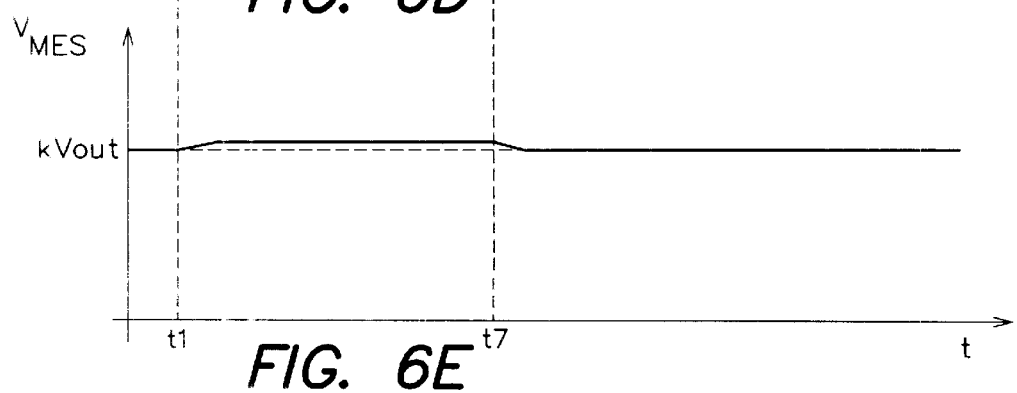

In FIG. 6E, signal $V_{MES}$ appears to slightly increase between times t1 and t7. This increase, which is spurious and non-compulsory, is however negligible and has been illustrated to better show the measurement period. Accordingly, voltage kVout (which is proportional to output voltage Vout of the secondary winding) is stored during measurement periods. The rest of the time, this stored voltage remains available for control circuit 11. Circuit 11 thus permanently receives a voltage level (updated at the switching frequency) which is a function of output voltage Vout, and which enables reliable and accurate control.

An advantage of the present invention is that by properly sizing the averager circuit (low time constant as compared to the demagnetization durations, sufficient to average the cycle beginning oscillations), whatever the current surge by the load, the present invention enables maintaining output voltage Vout at the desired value.

Another advantage of the present invention is that it requires no measurement on the secondary winding used to supply the load. Thus, any use of means of optocoupler or transformer type to convey a regulation signal between the secondary and the primary is avoided.

Figure 7:
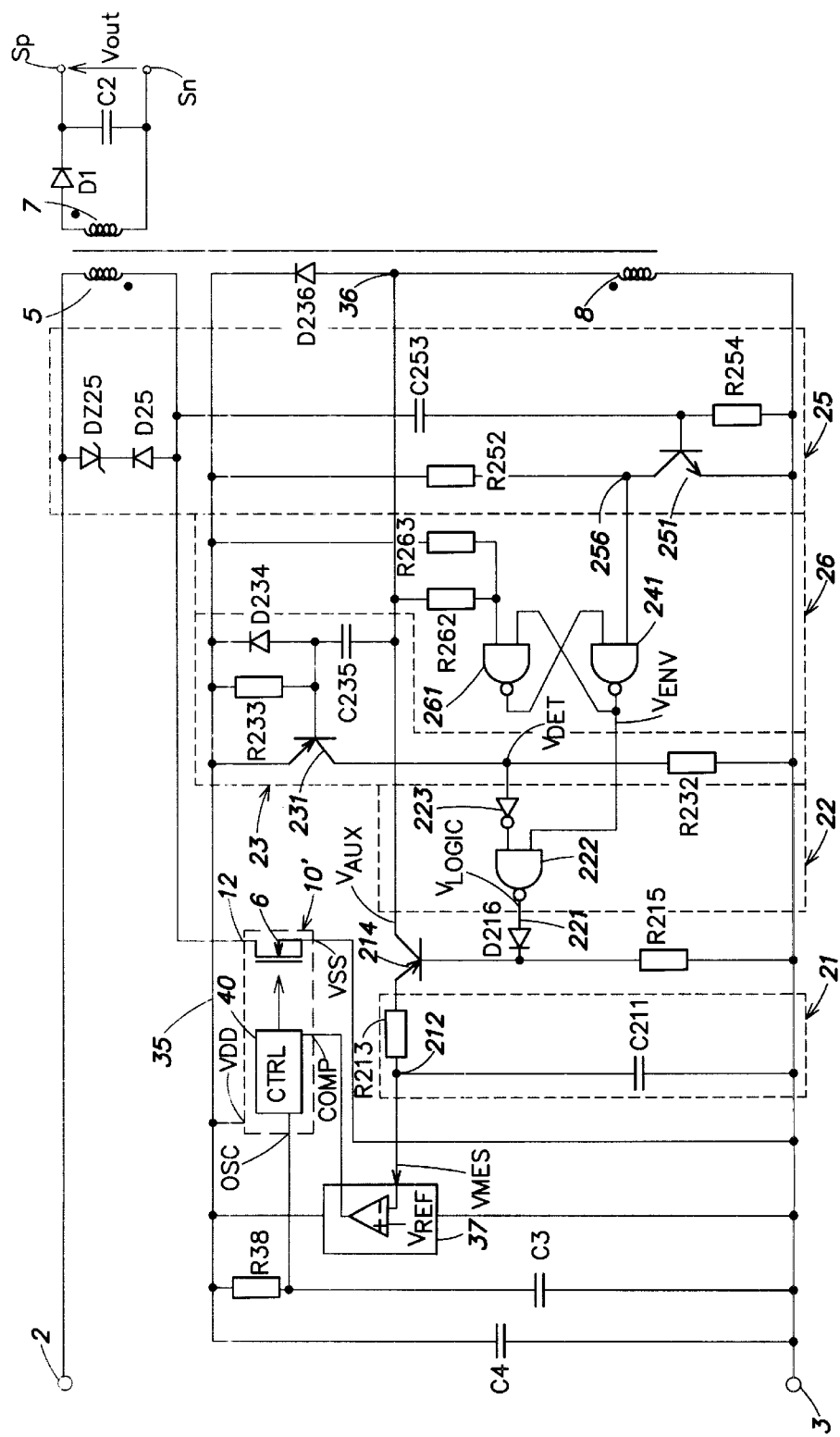
FIG. 7 is a detailed electric diagram of a power converter according to the present invention.

FIG. 7 shows an example of a detailed electric diagram of a power converter according to the present invention. In the example of FIG. 7, switch 6 is integrated with its control circuit in a VIPER-type circuit 10'. VIPER circuit is here shown with terminals different from the representation of FIG. 1. This representation shows a block 40 (CTRL) of control of switch 6. An input OSC of block 40 receives an oscillation frequency. Circuit 10' is supplied by voltage Vdd. Block 40 receives, on a terminal COMP, a current order intended for MOS transistor 6.

As previously, terminal 12 of circuit 10' corresponding to the drain of transistor 6 is connected to the phase point of primary winding 5. The source of transistor 6 corresponds to terminal Vss of circuit 10', connected to ground 3. A capacitor C4 connects a local supply line 35 (Vdd) to terminal 3. Terminal OSC of circuit 10' is connected to the midpoint of a series connection of a resistor R38 with a capacitor C3, between line 35 and ground 3.

Averager circuit 21 is formed of an RC network. A capacitor C211 connects an output terminal 212 of averager 21 to ground 3. Terminal 212 is connected, by a resistor R213, to a switch 214 controlled by signal $V_{LOGIC}$. Switch 214 is, for example, formed of a bipolar PNP-type transistor having its emitter connected to resistor R213 and its collector connected to phase point 36 of secondary winding 8. The base of transistor 214 is connected to ground by a resistor R215 and, by a diode D216, to an output terminal 221 of logic circuit 22 providing signal $V_{LOGIC}$. As a specific example of implementation, a capacitance C211 of 470 pf and a resistance R213 of 1 kΩ may be chosen.

Output 212 of the averager circuit providing signal $V_{MES}$ is connected to a shaping circuit 37 supplied by voltage Vdd. The output of shaping circuit 37 is connected to terminal COMP of circuit 10'. Block 37 integrates, for example, an error amplifier, a negative input of which receives voltage $V_{MES}$ and a positive input of which receives a reference voltage $V_{REF}$. The output of the error amplifier is connected to terminal COMP. When voltage $V_{MES}$ is greater than the reference voltage, the voltage applied on terminal COMP decreases. This results in a decrease of the power transmitted to the secondary. Conversely, if voltage $V_{MES}$ is smaller than the reference voltage, the power transmitted to the secondary is increased.

In the example of FIG. 7, signal $V_{LOGIC}$ is provided by a NAND gate 222. A first input of gate 222 receives signal $V_{DET}$ having crossed an inverter 223. A second input of gate 222 receives signal $V_{ENV}$.

When signal $V_{ENV}$ is low, that is, outside of the authorized demagnetization window, output 221 of gate 222 is forced to the high state independently from the state of signal $V_{DET}$. Transistor 214 is thus off.

When signal $V_{ENV}$ is high, the state of signal $V_{LOGIC}$ depends on the state of signal $V_{DET}$, and thus on edge detector 23.

Block 23 of detection of the end of demagnetization of auxiliary winding 8 is formed of a PNP-type bipolar transistor 231, having its emitter connected to local supply line Vdd 35 and its collector connected, by a resistor R232, to ground. The base of transistor 231 is connected to line 35 by a resistor R233 and to the midpoint of a series association of a diode D234 with a capacitor C235 between line 35 and phase point 36 of auxiliary winding 8. The anode of diode D234 is connected to the base of transistor 231 and its cathode is connected to line 35.

According to the present invention, phase point 36 does not directly form line 35 of provision of positive voltage Vdd. A diode D236 having its anode connected to phase point 36 and its cathode connected to line 35 is provided. Voltage Vdd thus corresponds to voltage $V_{AUX}$ across the auxiliary winding minus the voltage drop in diode D236 (approximately 0.6 V).

At the beginning of a demagnetization cycle, the voltage across the auxiliary winding increases. As soon as this voltage exceeds the voltage stored in capacitor C4 (voltage Vdd) plus 0.6 V, diode D236 is forward biased. Diode D234 brings the base potential of transistor 231 down to the potential of point 36. At each edge of voltage $V_{AUX}$, capacitor C235 charges or discharges according to the edge direction. Resistor R233 and capacitor C235 set the slope of signal $V_{AUX}$ necessary to cause a switching, to avoid taking into account the slow variations of voltage $V_{AUX}$. Transistor 231 turns off upon each falling edge when voltage $V_{AUX}$ is positive and upon each rising edge when voltage $V_{AUX}$ is negative (FIG. 6C). Signal $V_{DET}$ provided by the collector of transistor 231 is low when transistor 231 is off.

Detector 25 of the on periods of switch 6 is formed of an NPN-type bipolar transistor 251, having its emitter connected to ground 3 and its collector connected, by a biasing resistor R252, to line 35. The base of transistor 251 is connected to the junction point of a capacitor C253 and a resistor R254 between terminal 12 (phase point of winding 5) and ground 3. Capacitor C253 is used to only take switching edges into account. Upon each turning-off of switch 6, the base of transistor 251 is positively biased (via capacitor C253 and switch 6). Transistor 251 is on and its collector point 256) indicates a low state. Upon each turning-off of switch 6, the potential of terminal 12 abruptly increases. This increase is transferred to the base of transistor 251 which turns on and then grounds output point 256 of detector 25.

If necessary, to absorb the leakage power of the transformer, a zener diode DZ25 in series-opposition with a diode D25 is provided across primary winding 5. The anode of zener diode DZ25 is connected to positive terminal 2 of application of the rectified and filtered voltage. The anode of diode D25 is connected to the phase point of winding 5.

The signal provided by circuit 25 is not sufficient to define signal $V_{ENV}$. Indeed, from time t8 (FIG. 6D),. switch 6 remaining off, the phase point of winding 5 becomes negative (voltage $V_{AUX}$ becoming negative). Transistor 251 remains off despite the oscillations of signal $V_{AUX}$. Indeed, the slopes of signal $V_{AUX}$ are then too small for capacitor C253 to have time to turn transistor 251 on when signal $V_{AUX}$ becomes positive again. Advantage is here taken of the slope difference between demagnetization beginning peaks and the oscillations subsequent to the demagnetization. This operation continues until time t9 (FIG. 6C) where the turning-on of switch 6 definitively turns off transistor 251 until the next demagnetization cycle.

In the embodiment of FIG. 7, signal $V_{ENV}$ is provided by a NAND gate 241 having a first input connected to point 256. Gate 241 belongs to an RS flip-flop constitutive of detector 26. This flip-flop includes a second NAND gate 261 having a first input connected to the output of gate 241 and its output connected to the second input of gate 241. A second input of gate 261 is connected, by resistors R262 and R263, respectively to points 36 and 35. Resistors R262 and R263 have, preferably, the same value. Accordingly, the second input of gate 261 receives a voltage corresponding to half the difference between voltage Vdd and voltage $V_{AUX}$.

When voltage $V_{AUX}$ becomes negative at time t8, diode D236 is off and the voltage applied on the second input of gate 261 is smaller than the threshold of this gate 261, which approximately corresponds to half voltage Vdd. Indeed, the gates are supplied by voltage Vdd provided by capacitor C235. Since voltage $V_{AUX}$ is negative, the level received by gate 261 is necessarily lower than Vdd/2. The output of gate 261 is thus forced to the high state, whereby gate 241 provides a low signal (its first input being high by the turning-off of transistor 251).

When voltage $V_{AUX}$ becomes positive again (time t10, FIG. 6A), the first input of gate 241 remains high as has been indicated hereabove. Further, the level applied on the second input of gate 261 remains smaller than the threshold of this gate. Accordingly, the output of gate 261 remains high, whereby signal $V_{ENV}$ remains low. The next turning-off of switch 6 must be awaited for signal $V_{ENV}$ to switch state.

Of course, the present invention is likely to have various alterations, modifications, and improvements which will readily occur to those skilled in the art. In particular, the values to be chosen for the different components constitutive of the power converter are within the abilities of those skilled in the art according to the application and based on the functional indications given hereabove. Further, adapting the power converter to inverted detection signals or to other detection signals than those described hereabove is also within the abilities of those skilled in the art. Moreover, other circuits, integrated or not, equivalent to the VIPER circuit, may be used. For example, the VIPER circuit may be replaced with a pulse-width generation and modulation circuit (for example, an integrated circuit sold by STMicroelectronics Company under trade name UCC3824) associated with a separate switch (for example, an N-channel MOS transistor having its gate connected to an output of the integrated circuit by a resistor).

Such alterations, modifications, and improvements are intended to be part of this disclosure, and are intended to be within the spirit and the scope of the present invention.

Accordingly, the foregoing description is by way of example only and is not intended to be limiting. The present invention is limited only as defined in the following claims and the equivalents thereto.

What is claimed is:

1. A voltage converter including
    a circuit for controlling a switch for providing current to a primary winding of a transformer with inverted phase points, a secondary winding of which is associated with a capacitor for providing a regulated D.C. output voltage and an auxiliary winding of which provides a supply voltage of the control circuit, and
    means for measuring an average value of a voltage across the auxiliary winding close to the end of its demagnetization periods,
    wherein the measurement means comprise a resistive and capacitive network forming an averager, a time constant of which is small compared to a switch control pulse period.

2. The converter of claim 1, wherein said measurement means receive the voltage of the auxiliary winding only during demagnetization periods of the secondary winding.

3. The converter of claim 2, wherein the converter includes means for detecting the demagnetization periods of the auxiliary winding.

4. The converter of claim 3, wherein said detection means includes:
    a first circuit providing a two-state signal of detection of edges of the voltage across the auxiliary winding; and
    a second circuit for defining a window in which a detection result of the first circuit is taken into account.

5. The converter of claim 4, wherein said window starts with an opening of said switch and ends with a first following zero crossing of the voltage across the auxiliary winding.

6. The converter of claim 1, wherein a average voltage across the auxiliary winding is used to control a width of the switch turn-on pulses.

7. The power converter of claim 6, wherein the switch and its control circuit are integrated in a same circuit.

8. A voltage converter comprising:
    a transformer including a primary winding, a secondary winding, and an auxiliary winding, the secondary winding providing a current that produces an output voltage of the voltage converter;
    a switch to connect a voltage to the primary winding; and
    a regulating circuit to measure an average value of a voltage across the auxiliary winding during demagnetization periods of the auxiliary winding and to control the switch based on the average value.

9. The voltage converter of claim 8, wherein the regulating circuit includes an averager having a time constant that is small compared to a control pulse period of the switch.

10. The voltage converter of claim 9, wherein the averager includes a resistive and capacitive network.

11. The voltage converter of claim 8, wherein the regulating circuit is operable to measure the voltage across the auxiliary winding only during demagnetization periods of the secondary winding.

12. The voltage converter of claim 11, wherein the voltage converter includes a detection circuit to detect the demagnetization periods of the auxiliary winding.

13. The voltage converter of claim 12, wherein the detection circuit includes:
    a first circuit providing a two-state signal of detection of edges of the voltage across the auxiliary winding; and a second circuit for defining a window in which a detection result of the first circuit is taken into account.

14. The voltage converter of claim 13, wherein the second circuit defines the window as starting with an opening of the switch and ending with the voltage across the auxiliary winding changing from a positive value to a negative value for a first time after the opening of the switch.

15. The voltage converter of claim 8, wherein the regulating circuit is operable to control a width of each turn-on pulse of the switch based on the measured average value.

16. The voltage converter of claim 8, wherein the regulating circuit is operable to measure the average value of the voltage across the auxiliary winding close to the end of the demagnetization periods of the auxiliary winding.

17. A method of converting voltage using a voltage converter including a transformer having a primary winding, a secondary winding, and an auxiliary winding, the secondary winding providing a current that produces an output voltage of the voltage converter, and a switch that connects a voltage to the primary winding, the method comprising:

measuring an average value of a voltage across the auxiliary winding during demagnetization periods of the auxiliary winding; and controlling the switch based on the average value.

18. The method of claim 17, wherein measuring the average value includes using a time constant that is small compared to a control pulse period of the switch.

19. The method of claim 18, wherein measuring the average value includes using a resistive and capacitive network.

20. The method of claim 17, wherein measuring the average value includes measuring the voltage across the auxiliary winding only during demagnetization periods of the secondary winding.

21. The method of claim 20, wherein measuring the average value includes detecting the demagnetization periods of the auxiliary winding.

22. The method of claim 21, wherein detecting the demagnetization periods of the auxiliary winding includes:

providing a two-state signal of detection of edges of the voltage across the auxiliary winding; and defining a window in which a detection result of the first circuit is taken into account.

23. The method of claim 22, wherein defining the window includes defining the window as starting with an opening of the switch and ending with the voltage across the auxiliary winding changing from a positive value to a negative value for a first time after the opening of the switch.

24. The method of claim 17, wherein controlling the switch includes controlling a width of each turn-on pulse of the switch based on the measured average value.

25. The method of claim 17, wherein measuring the average value includes measuring the average value of the voltage across the auxiliary winding close to the end of the demagnetization periods of the auxiliary winding.

26. A voltage converter comprising:

a transformer including a primary winding, a secondary winding, and an auxiliary winding, the secondary winding providing a current that produces an output voltage of the voltage converter;

a switch to connect a voltage to the primary winding; and means for measuring an average value of a voltage across the auxiliary winding during demagnetization periods of the auxiliary winding and controlling the switch based on the average value.

27. The voltage converter of claim 26, wherein the means for measuring the average value includes means for measuring the average value of the voltage across the auxiliary winding close to the end of the demagnetizing periods of the auxiliary winding.

* * * * *

UNITED STATES PATENT AND TRADEMARK OFFICE
CERTIFICATE OF CORRECTION

PATENT NO.     : 6,590,789 B2
DATED          : July 8, 2003
INVENTOR(S)    : Alain Bailly It is certified that error appears in the above-identified patent and that said Letters Patent is hereby corrected as shown below:

Column 2,
Line 28, should read -- Iout taken by the load connected across terminals Sp and Sn --

Column 8,
Line 60, should read -- collector (point 256) indicates a low state. Upon each --

Column 12,
Line 32, should read -- winding close to the end of the demagnetization periods of the --

Signed and Sealed this

Seventh Day of October, 2003

JAMES E. ROGAN
*Director of the United States Patent and Trademark Office*